Figure 1:
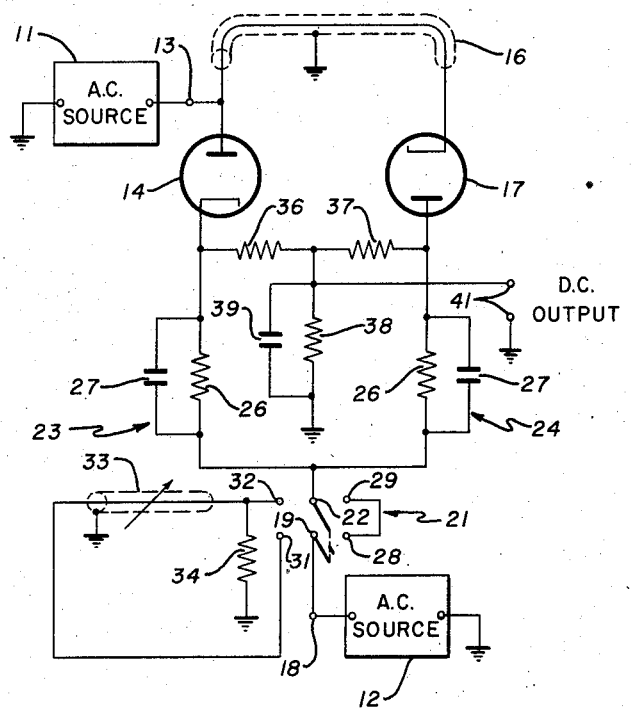

Sept. 8, 1959     D. O. KIPPENHAN     2,903,581

PHASE DETECTOR

Filed June 29, 1956

INVENTOR.
DEAN O. KIPPENHAN
BY
ATTORNEY.

United States Patent Office 2,903,581
Patented Sept. 8, 1959

2,903,581

PHASE DETECTOR

Dean O. Kippenhan, Castro Valley, Calif., assignor to the United States of America as represented by the United States Atomic Energy Commission Application June 29, 1956, Serial No. 595,033

4 Claims. (Cl. 250—27)

The present invention relates to phase detector circuits in general and, more particularly, to such a circuit for producing a D.C. voltage of polarity and magnitude depending upon the phase relationship between two A.C. signals.

Many circuits are known for developing a D.C. voltage proportional to the phase angle difference between a pair of A.C. signals. Such circuits are particularly well adapted to detecting small departures in phase from a preset phase relationship existing between two regulated signals and producing in response thereto an error signal which may be applied to a phase control system capable of effecting a corresponding phase angle error compensation in the preset phase relationship. Known phase detectors generally require balanced voltages for suitable operation, thereby necessitating in general the use of transformers for applying alternating energy to the detector circuit. At very high frequencies (e.g., 50 mc.), however, it is difficult to obtain properly balanced voltages from a transformer since minor structural imperfections therein tend to cause significant unbalance in voltages derived therefrom. The use of phase detector circuits of the foregoing type is consequently limited and disadvantageous in very high frequency work.

The present invention overcomes the limitations and disadvantages associated with known phase detector circuits by providing such a circuit wherein transformers are eliminated and which is therefore particularly advantageous for use at very high frequencies. In accordance with the present invention the phase detector generally comprises a circuit for producing a D.C. voltage proportional to the phase difference between two alternating signal voltages to be compared wherein one of said voltages is applied to two rectifier circuits in phase opposition by means of a half wave transmission line and the other voltage is commonly applied to said rectifier circuits to derive two direct current voltages which are equivalent respectively to the vector sum and vector difference of the voltage signals to be compared. The two D.C. voltages so derived are combined in phase opposition so that variations in their magnitudes, representing positive and negative departures in phase between the alternating signal voltages, produce a single D.C. voltage having amplitude and polarity characteristics dependent upon such phase departure. The latter D.C. voltage may then be employed, e.g., in conjunction with a phase control system to maintain phase relationships between the compared signal voltages.

Accordingly, the present invention is variously useful as a phase detector for manifold utilitarian purposes, particularly in very high frequency work where conventional phase detectors are rendered unreliable. The invention is especially useful in the field of nuclear research as a phase detector in servo control systems of various particle accelerators operating at very high frequencies, e.g., linear accelerators, cyclotrons, synchrotrons, and the like, wherein it is necessary to maintain proper phase relations between certain voltages and currents affecting particle acceleration. The invention is also useful as a ratio detector in frequency modulation and phase modulation communications receivers for deriving amplitude modulated signals varying in accordance with the frequency deviation or phase deviation from a known carrier frequency of a frequency modulated or phase modulated signal.

Therefore, it is an object of the present invention to provide a device for indicating departure from a predetermined phase relationship between two alternating current energies.

It is another object of the present invention to provide a phase detector having symmetrically bi-polar output voltage variation with respect to phase deviation.

A very important object of the present invention is to provide a phase detector capable of very high frequency operation.

Another important object of the invention is to provide a phase detector capable of satisfactory operation even when the voltages to be compared are harmonically related.

One other object of the present invention is to provide a phase detector which is suitably operative regardless of whether the voltages supplied thereto for comparison are from balanced or unbalanced sources.

Still another object of the present invention is to provide a very stable phase detector.

It is a further object of the present invention to provide a phase detector wherein changes in supply voltage amplitudes from the sources being compared have negligible effect on conditions for zero output.

Figure 2:
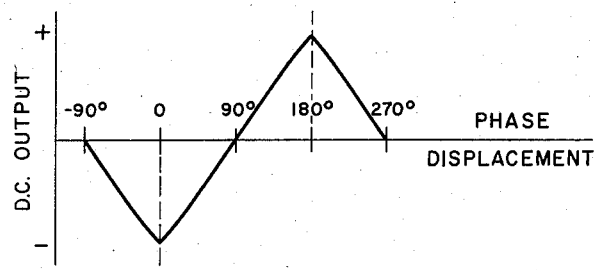

Other objects and advantages of the invention will be apparent in the following description and claims considered together with the accompanying drawing of which:

Figure 1 is a schematic circuit diagram of a preferred embodiment of the present invention; and Figure 2 is a graphical illustration of the D.C. ouput voltage vs. phase deviation characteristic of the embodiment of Fig. 1.

Referring now to the drawing, and in particular to Fig. 1, there is shown a phase detector circuit for detecting the phase relationship between alternating energies from a source 11 and a source 12. Source 11 may be, for example, a standard comparison wave from a highly stabilized oscillator while source 12 may comprise the ouput from a circuit to be regulated, stabilized, or otherwise controlled.

Briefly, the phase detector circuit may be considered as a three-paralleled-element bridge circuit in which the elements comprise, respectively, a reference voltage section, a section to which the voltage to be compared is applied and a balanced resistor comparator section which provides the output phase departure indicator voltage.

More particularly, the reference voltage source 11 is coupled between ground and a reference input terminal 13 connected to the juncture of an anode of a rectifier 14 and one end of a half-wave transmission line 16, the other end of which is connected to the cathode of an inverted rectifier 17. Rectifiers 14, 17 may be of any suitable type, e.g., conventional vacuum diodes, or preferably crystal diodes, while transmission line 16 is advantageously selected to be coaxial cable cut to a half wave length of the frequency of the particular reference voltage applied to terminal 13, i.e., a half wave length of the voltage output of source 11. The voltages applied to rectifiers 14, 17 are consequently of equal magnitude and frequency, but phased 180° with respect to each other.

The energy from voltage source 12 to be compared is coupled between ground and a comparison voltage input terminal 18. Such terminal 18 is connected to one center terminal 19 of a double-pole-double-throw switch 21, the other center terminal 22 of which is connected to the midpoint of identical filter networks 23, 24 connected in series between the cathode and anode, respectively, of rectifiers 14, 17. Filter networks 23, 24 each comprises, for example, a load resistor 26 connected in parallel with a shunt filter capacitor 27.

Pole terminals 28, 29 defining one throw position of switch 21 are short circuited to connect A.C. source 12 directly to the mid-point of filter networks 23, 24. Pole terminals 31, 32 defining the other throw position of switch 21 are connected in series with a variable phase shifting network which at the very high operating frequencies of particular interest in the present invention (i.e., frequencies the order of 50 mc.) is preferably a variable length transmission line 33 terminated in a shunt resistance 34 equal to the characteristic impedance of the line. Consequently with switch 21 in the latter "phase shift" position, the length of transmission line 33 is adjustable to arbitrary fractions of a wave length of the frequency of the voltage from source 12 to correspondingly alter the normal phase thereof prior to application to the mid-point of filter networks 23, 24.

Equal ohmage resistors 36, 37 of the comparator section of previous mention are series-connected between the cathode and anode of rectifiers 14, 17, respectively. An output load resistor 38 and shunt-connected by-pass capacitor 39 are coupled between the juncture of the two equal ohmage resistors 36, 37 and ground. Output terminals 41 connected across load resistor 38 provide convenient means for obtaining a D.C. voltage proportional to the phase relationship of the compared voltages from sources 11, 12.

With the circuit of the hereinbefore described embodiment of the present invention suitably energized, double-pole-double-throw switch 21 in the direct throw position, and input terminals 13, 18, respectively, energized with alternating voltages from sources 11, 12 related in phase by an angle, $\theta$, it is to be noted that the voltage from source 11 is applied directly to the anode of rectifier 14 and, with a 180° phase shift introduced by transmission line 16, to the cathode of rectifier 17. The voltage from source 12 on the other hand is applied directly through short-circuited terminals 28, 29 of switch 21 and filter networks 23, 24 to the cathode and anode, respectively, of rectifiers 14, 17. Thus, the voltages from sources 11, 12 effectively oppose and aid each other in producing voltage drops across rectifiers 14, 17, respectively. Consequently, a filtered D.C. voltage is developed across filter network 23 which is proportional to the D.C. component of the vector difference of the A.C. voltages from sources 11, 12. Similarly, a filtered D.C. voltage is developed across filter network 24 which is proportional to the D.C. component of the vector sum of said source voltages. Furthermore, since the foregoing D.C. difference and sum voltages are both necessarily proportional to cos $\theta$ and are applied to opposite sides of the comparator section provided by the series arrangement of equal ohmage resistors 36, 37, a D.C. voltage is developed at the juncture thereof and across output load resistor 38 and therefore output terminals 41 which is equal to the algebraic difference between such difference and sum voltages and proportional to cos $\theta$.

Observing established voltage and current convention, it is to be noted that the D.C. vector difference voltage applied to comparator resistor 36 produces a voltage drop across output resistor 38 in a positive direction while a voltage drop in a negative direction is established thereacross due to the D.C. vector sum voltage at comparator resistor 37. Since the sum voltage is necessarily of greater magnitude than the difference voltage for positive values of cos $\theta$, i.e., for phase angle between 0 and ±90°, the D.C. output voltage developed across resistor 38 and output terminals 41 is negative. Similarly, the D.C. output voltage is positive for negative values of cos $\theta$, i.e., for $\theta$ between 90° and 270°, the difference voltage being of greater magnitude than the sum voltage for such phase angles. When the phase angle $\theta$ is 90° or —90° (270°), cos $\theta$ is zero and the D.C. output voltage at terminals 41 is zero, the difference and sum voltages applied to comparator resistors 36, 37, respectively, being equal. A plot of the D.C. voltage obtained at output terminals 41 with respect to the phase angle $\theta$ between the alternating voltages applied to terminals 13, 18 from sources 11, 12, respectively, is consequently of the character illustrated in Fig. 2. As shown therein, the D.C. output voltage varies in a symmetrically bipolar manner from zero, at phase angle —90° to a negative maximum at 0°, then to 0 at 90° and a positive maximum at 180° and finally to zero at 270° (—90°). Since the output voltage variation as illustrated is essentially linear and symmetrically positive and negative about points of ±90° phase displacement, such output voltage may be utilized to great advantage for controlling the operation of phase regulating equipment adapted to accordingly compensate deviations above or below phase angle relationships of either ±90° to be established between the voltages of sources 11, 12.

In some instances it is advantageous that the points of zero voltage output normally occurring at ±90°, and necessarily the entire curve as illustrated in Fig. 2, be displaced to occur at any other arbitrary phase angle. To accomplish the foregoing, switch 21 is placed in the "phase shift" position corresponding to pole terminals 31, 32 thereby connecting variable transmission line 33 in series with A.C. source 12 and the mid-point of filter networks 23, 24.

Transmission line 33 is adjustable to arbitrary lengths which are fractions of a wave length of the frequency of the voltage from source 12 to correspondingly alter the normal phase thereof previous to being applied to filter networks 23, 24 such that in effect the entire curve of Fig. 2 is accordingly displaced in phase thereby displacing the operating points of zero voltage normally occurring at ±90° to any arbitrary phase angle.

As an example of the foregoing, consider the case where the voltages of sources 11, 12 are in phase such that the normal output voltage obtainable at terminals 41 would be a negative maximum (i.e., if switch 21 were in the "direct" position to apply the voltage from source 12 directly to filter networks 23, 24). With switch 21 in the "phase shift" position and transmission line 33 adjusted to a quarter wave length, the voltage now applied to the mid-point of filter networks 23, 24 is displaced in phase by 90° with respect to the output voltage of source 12, and therefore with respect to the voltage of source 11. Thus, the D.C. voltage at output terminals 41 is zero, i.e., the entire curve of Fig. 2 is shifted by 90° and the D.C. voltage at terminals 41 may be advantageously utilized to indicate phase departures from an in phase or opposed phase relationship existing between the voltages of sources 11, 12.

It will be apparent to those skilled in the art that the circuit of the present invention is reliably operable even when the voltages applied thereto for phase comparison are harmonically related since transmission lines such as lines 14, 33 introduce relatively little harmonic distortion to a signal applied thereto compared to the distortion introduced by transformers in conventional phase detectors. At certain phase relationships, therefore, between particular harmonically related voltages applied to the circuit of the present invention the resulting combination of voltages existing at rectifiers 14, 17 are distorted sine waves which are still symmetrical about the zero axis such that the rectified outputs from such rectifiers as applied to comparator resistors 36, 37 are equal positive and negative voltages. Consequently, no output is produced at terminals 41. It is readily shown that the number of particular phase relationships producing zero output at terminals 41 for a set of harmonically related voltages is directly proportional to the harmonic relation existing therebetween. For example, where one voltage is the second harmonic of the other, zero voltage output from terminals 41 occurs for phase relationships of 0°, 90°, 180°, 270°, as compared to zero voltage outputs for phase angles of 90° and −90° where the input voltages are of the same frequency. When the phase relationship between two harmonically related signals changes from one of the foregoing phase angles producing zero output, the combination of voltages applied to rectifiers 14, 17 are no longer symmetrical about the zero axis resulting in a rectified output from one of such rectifiers which is greater than the output from the other. Thus a D.C. voltage is developed at output terminals 41 which is proportional to phase, the D.C. voltage distribution with respect to phase angle being symmetrically bi-polar about the above-mentioned points of zero output voltage. Such output voltage is suitable for controlling the operation of phase regulating equipment adapted to accordingly compensate deviations above or below any one of the phase angle relationships of the harmonically related source voltages producing zero D.C. output voltage.

It has been determined during operation that unbalance in the source voltages to be compared (e.g., the voltages of source 11, 12) has negligible effect on the satisfactory operation of the phase detector of the present invention, even at amplitude ratios of 2 or 3 to 1.

Although the present invention has been disclosed with respect to a single preferred embodiment, it will be apparent to those skilled in the art that numerous modifications and variations are possible within the spirit and scope of the invention and thus it is not intended to limit the invention except as defined in the following claims.

What is claimed is:

1. In a phase detector circuit for producing a direct current potential the magnitude of which is a function of the phase angle between first and second alternating input signals of very high frequency operating with respect to a common reference potential, the combination comprising a transmission line connected at one end to said first alternating input signal and having a length equal to a half wave-length of the frequency thereof to produce a third signal at the other end bearing a fixed phase opposition relation to said first signal, a pair of rectifiers, circuit means for applying to one of said rectifiers the vector sum of said first and second alternating input signals, circuit means for applying to the other of said rectifiers the vector sum of said second and third signals, and voltage comparator means connected between said rectifiers to rectifier terminals of opposite polarity to produce a direct current difference voltage proportional to the cosine of the phase angle between said first and second alternating input signals.

2. In a phase detector circuit for producing a direct current potential indicative of the phase departure from an arbitrary phase relationship existing between first and second sinusoidal input signals of very high frequency operating with respect to a common reference potential, the combination comprising a transmission line connected at one end to said first sinusoidal input signal and having a length equal to a half wave length thereof to produce a third sinusoidal signal at the opposite end bearing a fixed phase opposition relation to said first signal, a terminated variable length transmission line connected at one end to said second sinusoidal input signal to produce a fourth sinusoidal signal at the opposite end bearing an arbitrary fixed phase relation to said second signal dependent upon the length of said line, a pair of rectifiers, circuit means for applying to one of said rectifiers the vector sum of said first and fourth signals, circuit means for applying to the other of said rectifiers the vector sum of said third and fourth signals, and voltage comparator means connected between said rectifiers to rectifier terminals of opposite polarity to produce a direct current difference voltage proportional to the cosine of the difference of the phase angle between said first and second input signals and said arbitrary phase relation introduced by said variable length transmission line.

3. In a phase detector circuit for producing a direct current potential indicative of the phase angle between first and second very high frequency alternating energies operating with respect to a ground reference potential, the combination comprising a transmission line connected at one end to said first input energy and having a length equal to a half wave-length thereof, a pair of rectifiers each having an anode and a cathode, means connecting the anode of one of said rectifiers to one end of said transmission line, means connecting the cathode of the other of said rectifiers to the other end of said transmission line, a pair of equal resistance-capacitance filters connected in series between the cathode of said one rectifier and the anode of said other rectifier, means for applying said second input energy to the juncture between said filters, a pair of series connected comparator resistors connected in parallel with said series connected filters, a load impedance connected between the juncture of said comparator resistors and ground, and output terminal means connected across said load impedance providing a D.C. potential indicative of said phase angle.

4. In a phase detector circuit for producing a direct current control potential indicative of the phase departure from an arbitrary phase relationship existing between first and second alternating current input signals of very high frequency operating with respect to a ground reference potential, the combination comprising a transmission line connected at one end to said first alternating current input signal and having a length equal to a half wave length thereof, a pair of rectifiers each having an anode and a cathode, means connecting the anode of one of said rectifiers to one end of said transmission line, means connecting the cathode of the other of said rectifiers to the other end of said transmission line, a pair of equal resistance-capacitance filters connected in series between the cathode of said one rectifier and the anode of said other rectifier, a terminated variable length transmission line connected at one end to said second input signal and at the other end to the juncture between said filters, a pair of series connected comparator resistors connected in parallel with said series connected filters, a load impedance connected between the juncture of said comparator resistors and ground, and output terminal means connected across said load impedance whereby the length of said variable length transmission line may be arbitrarily pre-set such that the D.C. potential at said output terminal means is indicative of phase departure from a corresponding phase relationship between said alternating current input signals.

References Cited in the file of this patent

UNITED STATES PATENTS

| 2,568,250 | O'Brien | Sept. 18, 1951 |
| 2,707,751 | Hance | May 3, 1955 |
| 2,784,380 | Van De Lindt | Mar. 5, 1957 |
| 2,814,781 | Zaleski | Nov. 26, 1957 |

OTHER REFERENCES

"Measuring Phase at R.F.," article in Electronics, January 1956, pages 138–140.